Figure 1:
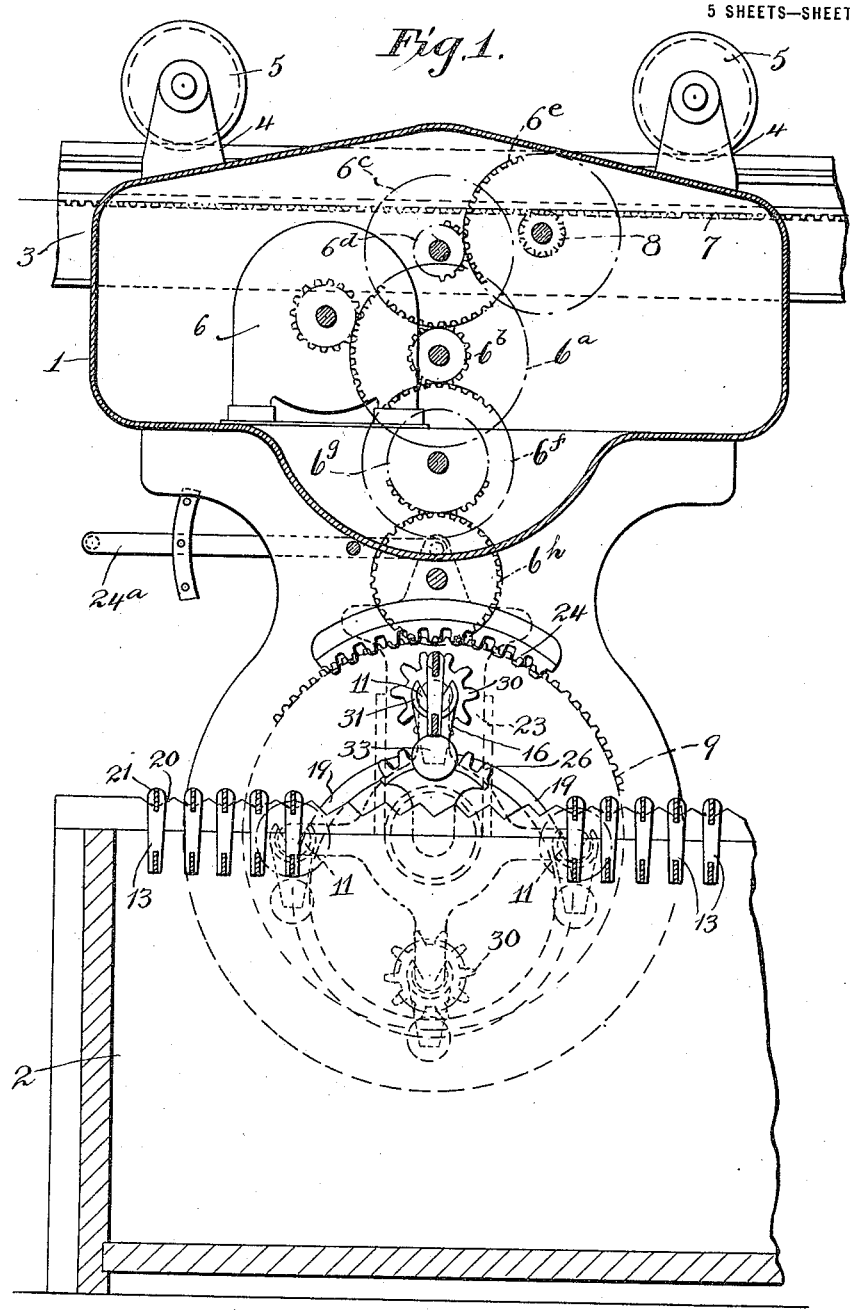

E. KRUSE.
MACHINE FOR DYEING, BLEACHING, WASHING, SCOURING, AND SUBJECTING TO LIKE PROCESSES HANKS OF YARN.
APPLICATION FILED NOV. 13, 1914.

1,150,685.

Patented Aug. 17, 1915.
5 SHEETS—SHEET 1.

WITNESSES

INVENTOR
EMIL KRUSE
ATTORNEY

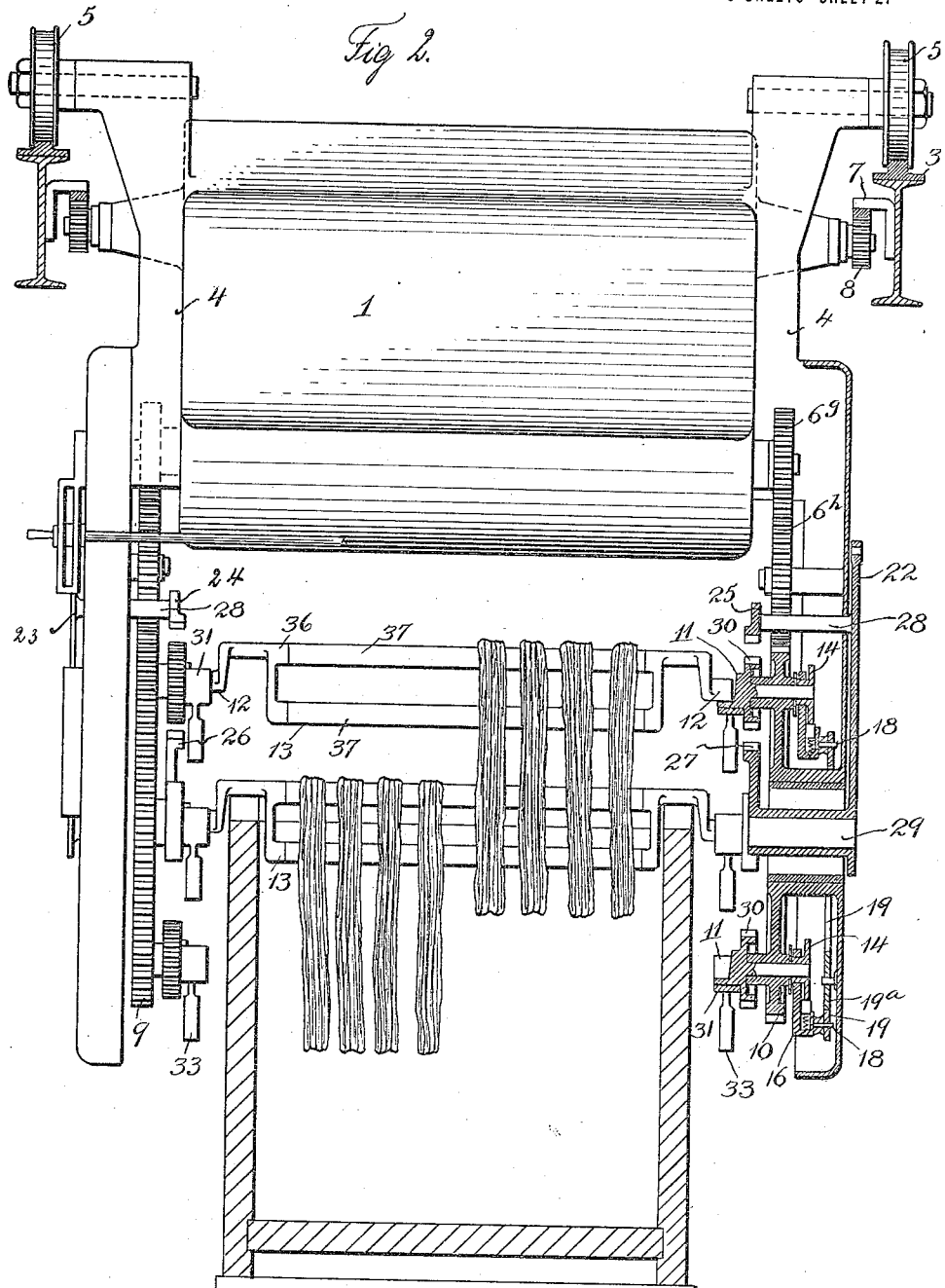

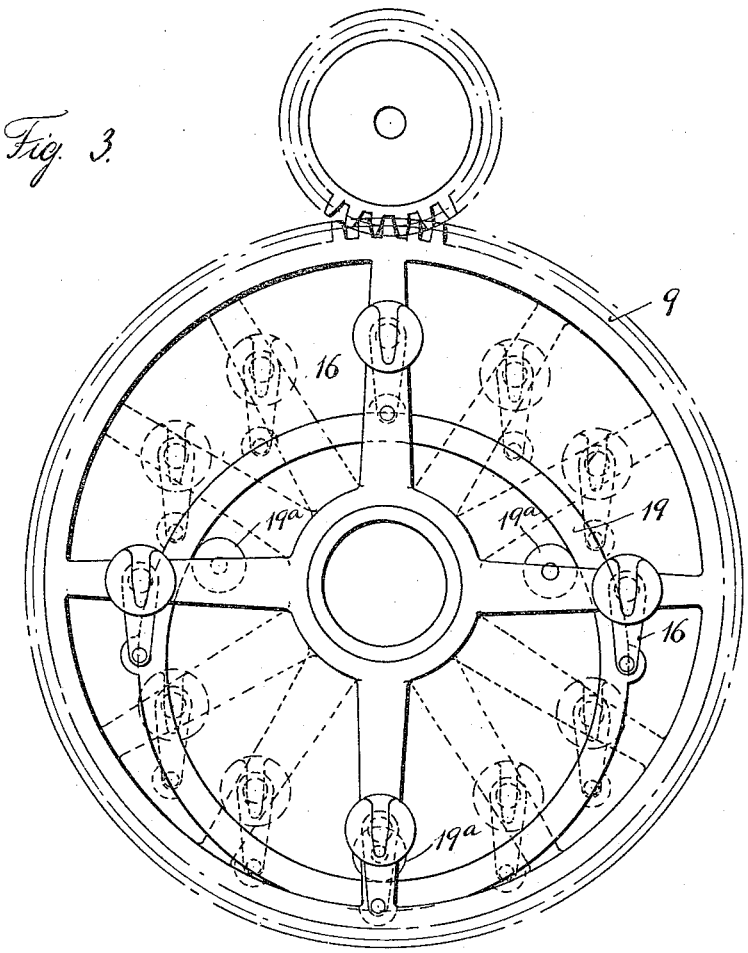

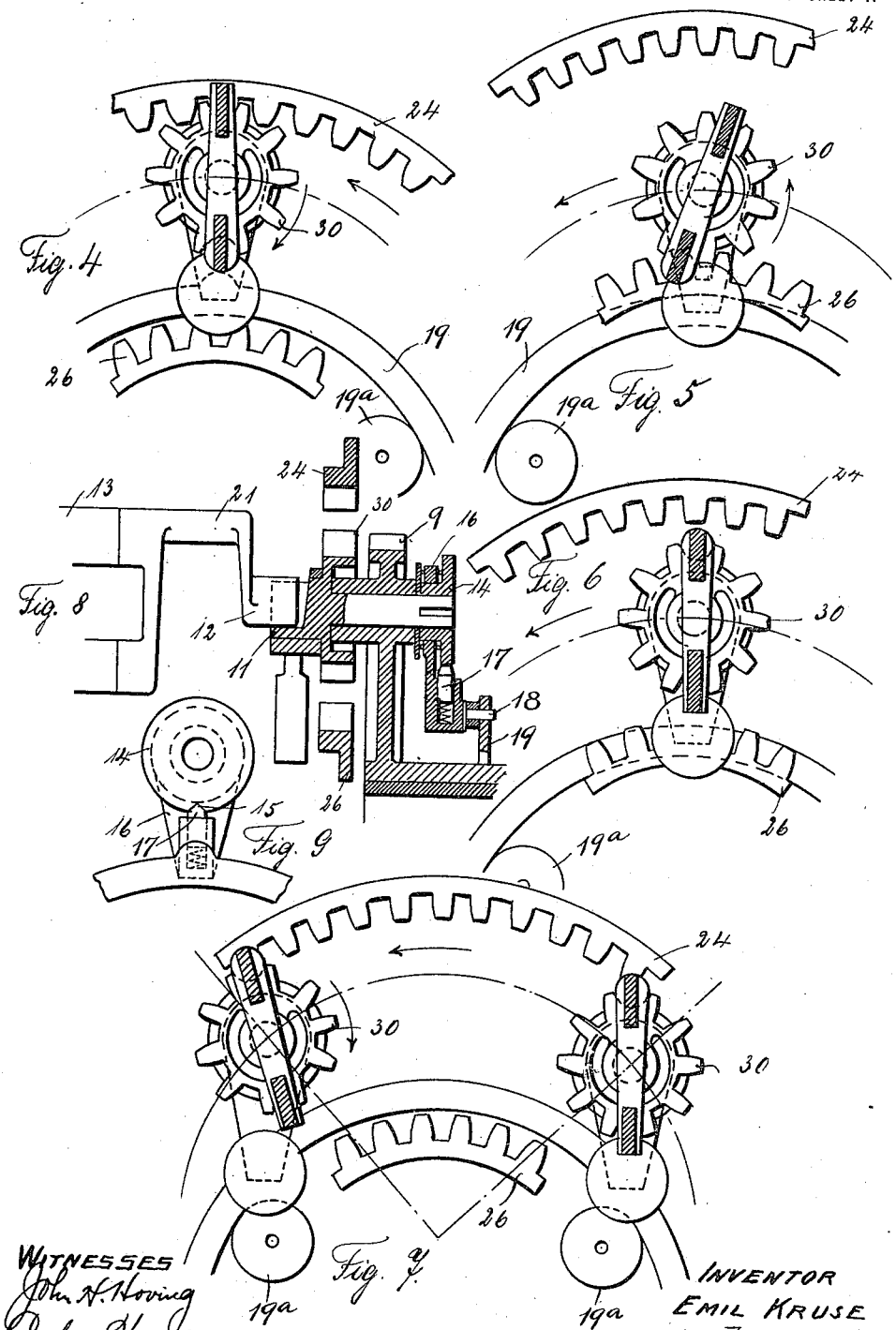

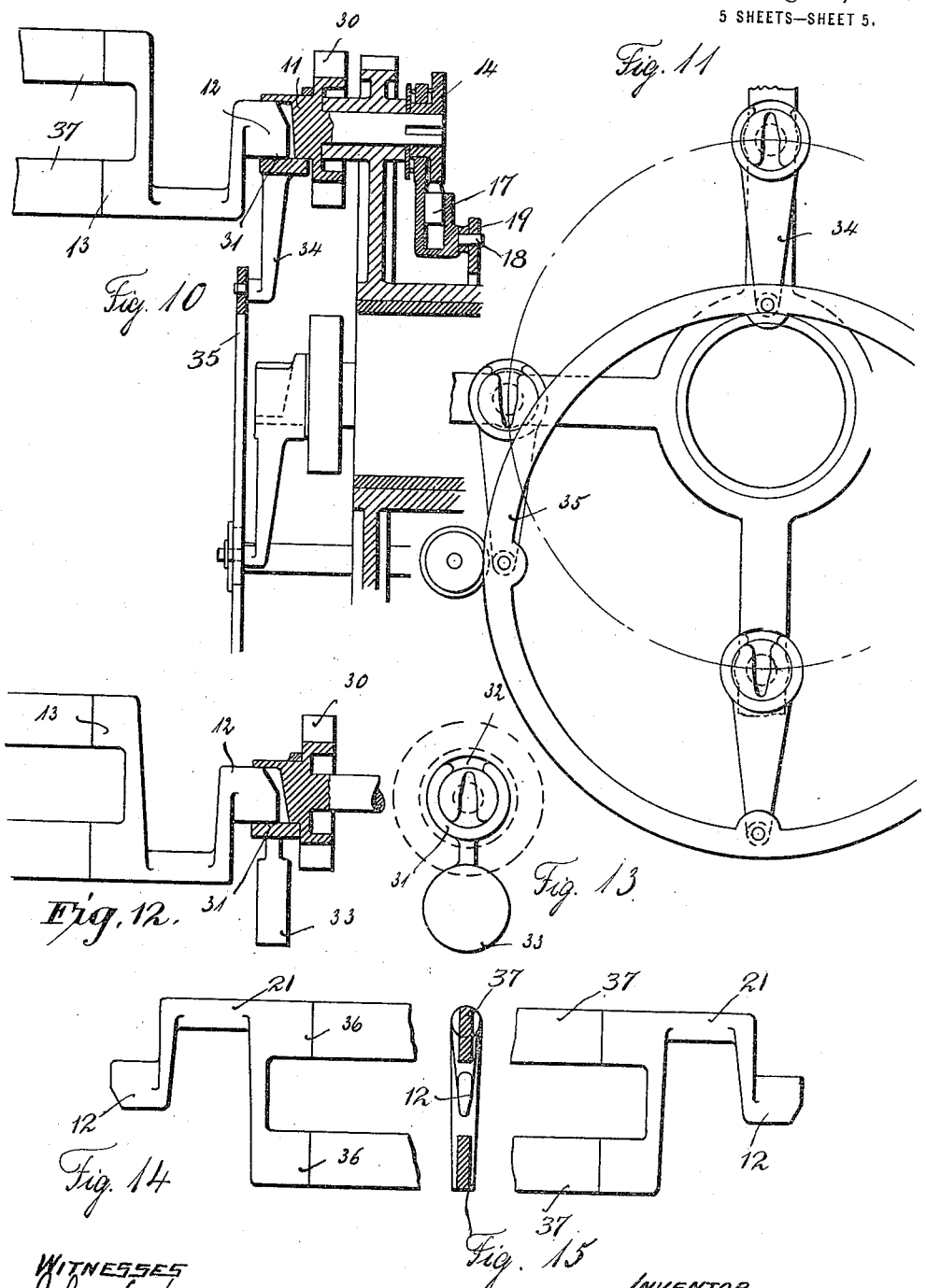

UNITED STATES PATENT OFFICE.

EMIL KRUSE, OF LANGERFELD, GERMANY.

MACHINE FOR DYEING, BLEACHING, WASHING, SCOURING, AND SUBJECTING TO LIKE PROCESSES HANKS OF YARN.

1,150,685. Specification of Letters Patent. Patented Aug. 17, 1915.

Application filed November 13, 1914. Serial No. 872,049.

*To all whom it may concern:*

Be it known that I, EMIL KRUSE, subject of the German Emperor, residing at Langerfeld, Westphalia, Germany, have invented a new and useful Machine for Dyeing, Bleaching, Washing, Scouring, and Subjecting to like Processes Hanks of Yarn; and I do hereby declare the following to be a full, clear, and exact description of the same.

This invention relates to a machine for dyeing, bleaching, washing, scouring and subjecting to like processes hanks of yarn.

The operation of this machine—which operation *per se* is old—is such that a carriage moving over the vat automatically moves and revolves the hank carriers which, as usually, rest in grooves on the top edge of said vat. It is also old to provide said carriage with pinions having means for engaging, moving and revolving said hank carriers. In the known machine referred to, however, the direction in which the carriers are revolved, depends on the direction in which the car or frame is traveling, for instance the carriers can be revolved in one direction only for a given direction of movement of the car.

According to this invention, displaceable toothed sectors are arranged on either side of the pinions for revolving the carriers, which sectors can at will be caused to engage said pinions or to let them pass freely. This renders it possible to alternately engage and disengage said sectors and by these means to impart to said carriers revolution to the right or to the left, or to disengage both sectors from the pinions of said carriers so that they are not revolved at all, all this independently of the direction in which the carriage is moving.

When the carriers are revolved in one direction of rotation only, as in the known machine, it may occur that the cords with which the several strands of each hank are bound, or loose threads of the hanks themselves, wind up on the carriers, thus entangling the entire hank. These cords or threads, being saturated with the liquor, are sticky and consequently may become attached to a part of the carrier frame. The consequence will be that in the first mentioned case that part of the hank having such cord is suspended on the carrier frame, so that this part of the hank no longer hangs down freely but revolves with that part of the carrier to which it has stuck. Finally, that part of the hank which rests on one part of the carrier, and is held to the other part by the said cord, will form a loop which envelops the carriers and partakes in its revolution so that the free part of the hank is wound about the carrier, and the entire hank becomes entangled. On further revolution of the carrier, the yarn will break or not be dyed at all. If, however, the direction of revolution is reversed after a time, the hank is unwound again, the cord becomes disengaged from the carrier and the hank returns to its normal position. In a similar manner, loose threads may stick to the carrier and, coöperating with a cord, entangle the hank. This can also be remedied by reversing the carrier. Consequently, when the person attending to the machine notices that a cord has become engaged, he will, in order to disengage it, reverse the carriers, causing the hank to return to its normal position.

The holders for the carriers have slotted bearings into which the heads of the carriers are inserted. In order to prevent said heads from falling out of these slots during their revolution, sleeves are provided to cover the openings of the slots for those positions in which the carrier heads might fall out. These sleeves are held in position by means of weights or cranks connected to rings arranged eccentrically to the axis of the wheels carrying the holders.

It is important that the carriers should be maintained in a vertical position while their pinions are not engaged by the sectors, *i. e.* while they are not revolving. This prevents the hanks from sticking to the carriers which sticking might occur when the carriers are in an inclined position; and the carriers are placed on the top edges of the vat in correct position. Care is taken to balance the carriers as otherwise they might cause vibration with their rapid revolution. They are so constructed that their axis of rotation co-incides with their axis of gravity. It follows that they have *per se* no tendency to assume a vertical position, and so it may occur that a carrier is taken through the machine and placed on the top edge of the vat in an inclined position. The consequence will be that the hanks stick to one side of the frame instead of hanging down freely, and so be dyed less on one side than on the other. When approaching the top edge of the vat, such a carrier would knock against the others or, as they are at very short distances apart, could not be placed in position at all. In order to avoid this, a ring is arranged eccentrically to the axis of the wheels on which the holders are carried. To this ring, cranks are connected which, on the other hand, are held engaging the holders by means of a yielding coupling which allows the holders to revolve as soon as their pinions are engaged by the sectors.

As mentioned, the carriers are balanced in relation to their axis of rotation. They have a flat head on either side just in their axis which is engaged by the slotted holders. The heads are fixed to U-shaped parts which are fastened to the frame of the carrier, and that in such a manner that, when the carriers are at rest on the top edges of the vat, the U parts are inverted and straddle the walls of the vat.

Reference is to be had to the accompanying drawings, in which—

Figure 1 is a side elevation partly in section, and Fig. 2 is a front elevation of the machine, also partly in section, Fig. 3 illustrates the device for holding the carriers in a vertical position while they are moved without being revolved, Figs. 4 to 7 illustrate several relative positions of the means for revolving the carriers, Figs. 8 and 9 illustrate the coupling between the carriers and those parts which hold them in a vertical position while being moved, Figs. 10 to 13 illustrate means for securing the carriers in their holders while they are revolving, Figs. 14 and 15 show a carrier in elevation and cross section, respectively.

The car 1 is supported on a track 2 arranged above the vat 3. It is carried on wheels 5 held in lateral extensions 4. For imparting motion to the carriage, a motor 6 is arranged, which by means of gear wheels $6^a$, $6^b$, $6^c$, $6^d$, $6^e$ rotates a pinion 8 engaging a rack 7. Further, the motor by means of further gear wheels $6^f$, $6^g$, and $6^h$ rotates the two holder wheels 9 and 10. On each of these wheels are rotatably carried holders 11 (Fig. 8). They have notches into which the flat heads 12 of the carriers 13 fit, so that the carriers must rotate with the holders. On the shaft of every holder there is fixed a disk 14 with a notch 15, and a crank 16 is free to rotate on the shaft. This crank carries a spring latch 17 which may engage notch 15. The pins 18 of all the cranks on one of the wheels 9 or 10 are connected to a ring 19 (Fig. 3) which is held by rollers $19^a$ eccentric to the axis of wheels 9 and 10. This causes the cranks 16—and with them the carriers 13—to be held in a vertical position while wheels 9 and 10 revolve.

The carriers 13, as Fig. 1 shows, rest in V shaped notches 20 on the top edges of the vat, in such a manner that only their upper parts 21 engage the vat. The machine, with one of its holders 11 on either side, seizes the heads 12 of that carrier which is in position, moves it on with the rotation of wheels 9 and 10, and, after half a revolution of said wheels, sets it down again on the top edge of the vat. While the carrier moves, it is held in a vertical position by means of ring 19 and cranks 16.

The bearings of wheels 9 and 10 in carriage 1 are hollow, see right hand part of Fig. 2. Slides 22, 23 are guided on each side of the carriage 1, and a lever $24^a$ serves to adjust said slides and maintain them in the desired position. Fixed on the slides are toothed sectors, those designated by 24 and 25 being above, and those designated by 26 and 27 below the highest position of holders 11. Sectors 24 and 25 are carried on stays 28 which extend to the inside of the frame from the slides 23 and 24. Sectors 26 and 27 are held by sleeves 29 extending through the hollow bearings of wheels 9 and 10.

Fixed on the shaft of each holder 11 is a pinion 30 adapted to engage sectors 24 and 26, or 25 and 27, respectively.

By means of lever $24^a$ either the upper sector 24 (Fig. 4) or the lower, 25, (Fig. 5) is caused to mesh with pinion 30. The sectors being stationary while the wheels 9, 10 rotate, it follows that pinions 30 roll on the sectors and cause to revolve the carrier frames held by the holders 11.

Cranks 16 do not oppose the revolution of the holders, as the spring latch 17 becomes disengaged from notch 15 as soon as the pinions 30 are engaged by one of the sectors. The length of said sectors is such that latch 17 again engages notch 15 when the pinion 30 is free of the sector with which it was meshing. The carrier is now in a vertical position again and is so set down on the top edge of the vat. For example, the machine may be operated in such a manner that at first the upper sectors 24 and 25 are caused to engage pinions 30 until the frame has moved through its predetermined path and then, for its return, the sectors 26, 27 are engaged with pinions 30, so that these pinions continue to revolve in the same direction. This is repeated until the hanks are thoroughly saturated, and then the sectors are caused to engage the pinions 30 in reversed order so that the carriers rotate in the opposite direction. Or both sectors may be disengaged, so that the carriers are moved without being revolved.

In order to prevent the heads 12 of the carriers from falling out of the notches of their holders, sleeves 31 are placed on said holders which, as Fig. 13 shows, are slotted at 32. These sleeves are, by means of weights 33 or cranks 34 and an eccentric ring 35, held in such a position that the slot 32 is always at the top of the holder. This enables the carriers to slide freely into the notches of the holders, while, when the holders revolve, the sleeve 31 closes the notches so that the heads of the carriers cannot fall out. Fig. 10 illustrates a carrier displaced for 180° out of the position of Fig. 1, the sleeves of its holders being held in position by an eccentric ring 35, and Fig. 12 illustrates a carrier in a similar position in a holder the sleeves of which are maintained by weights 33. In both cases the notches of the holders point downward and the head 12 of the carrier rests on the sleeve.

The carriers, (Figs. 14 and 15), are composed of the ends comprising the head 12, bearing part 21, and lugs 36 to which lugs the connecting parts 37 of the carrier are attached. The head parts are made of metal, iron, bronze, nickel, etc. The frames 37 are of wood or of the same metal as the head parts. The bearing parts 21 are at the top, while the heads 12 are exactly in the center line of the carriers. The edges of the heads 12 are rounded in order to facilitate their being engaged by holders 11.

I claim:

1. In a machine for dyeing, bleaching, washing, scouring and subjecting to like processes hanks of yarn, a vat, a carriage adapted to be moved over said vat, frames on which said hanks are carried, holders for engaging said frames, means for guiding said holders bodily in a circular path, means adapted to alternately impart a revolution in opposite directions to said holders independently of the direction in which said carriage is moved, and means for disengaging said revolution imparting means from said holders.

2. In a machine for dyeing, bleaching, washing, scouring and subjecting to like processes hanks of yarn, a vat, a carriage adapted to be moved over said vat, frames on which said hanks are carried, holders for engaging said frames, means for guiding said holders bodily in a circular path, means adapted to alternately impart a revolution in opposite directions to said holders independently of the direction in which said carriage is moved, means for disengaging said revolution imparting means from said holders, and means for maintaining said hand carrying frames in vertical position while they are being bodily displaced.

3. In a machine for dyeing, bleaching, washing, scouring and subjecting to like processes hanks of yarn, a vat, a carriage adapted to be moved over said vat, frames on which said hanks are carried, holders for engaging said frames, means for guiding said holders bodily in a circular path, pinions fixed to said holders, and toothed sectors adapted to be thrown into and out of engagement with said pinions.

4. In a machine for dyeing, bleaching, washing, scouring and subjecting to like processes hanks of yarn, a vat, a carriage adapted to be moved over said vat, frames on which said hanks are carried, holders for engaging said frames, means for guiding said holders bodily in a circular path, pinions fixed to said holders and toothed sectors arranged on either side of said pinions and adapted to be alternately engaged with said pinions.

5. In a machine for dyeing, bleaching, washing, scouring and subjecting to like processes hanks of yarn, a vat, a carriage adapted to be moved over said vat, frames on which said hanks are carried, holders for engaging said frames, means for guiding said holders bodily in a circular path, means adapted to alternately impart a revolution in opposite directions to said holders independently of the direction in which said carriage is moved, and means for disengaging said revolution imparting means from said holders, cranks loosely fitted on the shafts of said holders and connected with them by means of yielding couplings, and a ring arranged eccentrically to the axis of the wheels on which said holders are carried, said ring being pivotally connected to said cranks.

6. In a machine for dyeing, bleaching, washing, scouring and subjecting to like processes hanks of yarn, a vat, a carriage adapted to be moved over said vat, frames on which said hanks are carried, holders for engaging said frames, means for guiding said holders bodily in a circular path, means adapted to alternately impart a revolution in opposite directions to said holders independently of the direction in which said carriage is moved, and means for disengaging said revolution imparting means from said holders, said holders being slotted to receive heads disposed on said carriers, and means for keeping said slots closed while the holders are being revolved.

7. In a machine for dyeing, bleaching, washing, scouring and subjecting to like processes hanks of yarn, a vat, a carriage adapted to be moved over said vat, frames on which said hanks are carried, holders for engaging said frames, means for guiding said holders bodily in a circular path, means adapted to alternately impart a revolution in opposite directions to said holders independently of the direction in which said carriage is moved, and means for disengaging said revolution imparting means from said holders, said holders being slotted to receive heads disposed on said carriers, slotted sleeves arranged over said slotted holders, and means for maintaining said sleeves in such a position that they close the slots of said holders when they are pointing in a downward direction.

8. In a machine for dyeing, bleaching, washing, scouring and subjecting to like processes hanks of yarn, a vat, a carriage adapted to be moved over said vat, frames on which said hanks are carried, holders for engaging said frames, means for guiding said holders bodily in a circular path, means adapted to alternately impart a revolution in opposite directions to said holders independently of the direction in which said carriage is moved, and means for disengaging said revolution imparting means from said holders, said holders being slotted to receive heads disposed on said carriers, slotted sleeves arranged over said slotted holders, and weights for maintaining said sleeves in such a position that they close the slots of said holders when they are pointing in a downward direction.

9. In a machine for dyeing, bleaching, washing, scouring and subjecting to like processes hanks of yarn, a vat, a carriage adapted to be moved over said vat, frames on which said hanks are carried, holders for engaging said frames, means for guiding said holders bodily in a circular path, means adapted to alternately impart a revolution in opposite directions to said holders independently of the direction in which said carriage is moved, and means for disengaging said revolution imparting means from said holders, said carriers having U shaped parts at either end and flat heads arranged in the axis of gravity and rotation of said carriers, said heads being adapted to be engaged by said holders, the upper part of said U shaped ends being adapted to rest on the top edges of said vat.

In testimony whereof, I have signed my name to this specification in the presence of two subscribing witnesses.

EMIL KRUSE. [L. S.]

Witnesses:
ALBERT KEFER,
GEORGE G. W. WARD.

Copies of this patent may be obtained for five cents each, by addressing the "Commissioner of Patents, Washington, D. C."